United States Patent [19]

Kondo

[11] 4,184,716
[45] Jan. 22, 1980

[54] CONTROL VALVE ASSEMBLY FOR HYDRAULIC BRAKES

[75] Inventor: Hiroyuki Kondo, Anjo, Japan

[73] Assignee: Aisin Seiki Kabushiki Kaisha, Kariya, Japan

[21] Appl. No.: 915,269

[22] Filed: Jun. 13, 1978

[30] Foreign Application Priority Data

Jun. 20, 1977 [JP] Japan ................................ 52-73035

[51] Int. Cl.² ............................................. B60T 8/26
[52] U.S. Cl. .................................. 303/6 C; 303/22 R
[58] Field of Search ............. 188/195; 303/6 C, 22 R, 303/22 A, 24 F

[56] References Cited

U.S. PATENT DOCUMENTS

| 3,217,494 | 11/1965 | Stelzer | 303/6 C X |
| 3,450,443 | 6/1969 | Bueler | 303/6 C |
| 3,578,821 | 5/1971 | Guettier | 303/6 C X |
| 3,967,082 | 6/1976 | Remy | 303/6 C X |
| 4,118,077 | 10/1978 | Carre | 303/6 C |

*Primary Examiner*—Duane A. Reger
*Attorney, Agent, or Firm*—Finnegan, Henderson, Farabow & Garrett

[57] ABSTRACT

A control valve assembly for vehicle hydraulic brake systems having dual or split hydraulic pressure lines, including a body having two coaxial hydraulic chambers, one chamber being in one pressure line, and the other chamber in the other pressure line. A piston in each chamber is axially and serially arranged with the other piston, the pistons abutting each other at one end. Movement of each piston opens and closes a valve in the respective chamber which opens and closes the respective hydraulic pressure line. Hydraulic pressure acts on a circumferential step on each piston tending to close the valves. A single spring acts on the other end of one piston biasing both pistons in one direction tending to open the valves.

6 Claims, 4 Drawing Figures

CONTROL VALVE ASSEMBLY FOR HYDRAULIC BRAKES

BACKGROUND OF THE INVENTION

1. Field of the Invention

This invention relates to a control valve assembly for hydraulic brakes and more particularly to a control valve assembly having a pair of proportioning valve assemblies for a split brake system.

2. Description of the Prior Art

Conventionally, control valve assemblies for split brake systems have been proposed which include a pair of proportioning valve assemblies for each brake pressure supply line of the split brake system. The valve assemblies proportionally reduce increases in the output fluid pressures to increases in the magnitudes of the input fluid pressures in excess of a predetermined value. Each proportioning valve assembly includes a valve seat and a slidable piston on which a valve member is provided. Each proportioning valve assembly has a spring means which biases the piston into a desired position wherein the valve member is spaced from the valve seat when brake pressure is below a predetermined value, such as shown in the U.S. Pat. No. 3,669,505. This results in an increase in the number of parts and the complexity of construction. In addition, in order to modify the brake pressure in response to load conditions acting on the vehicle body, a further load-sensing spring means has to be provided. This requirement further increases complexity of construction.

SUMMARY OF THE INVENTION

The present invention provides an improved control valve assembly for hydraulic brakes which overcomes the various drawbacks mentioned above.

The present invention provides a control valve assembly for hydraulic brakes of simplified construction which is low in cost.

The present invention also provides a control valve assembly for hydraulic brakes which modifies brake pressure in response to load conditions acting on the vehicle body.

In accordance with the invention, a hydraulic pressure control valve assembly for vehicles having dual hydraulic brake systems is provided comprising a valve assembly body having first inlet and outlet ports for a first hydraulic pressure supply line and second inlet and outlet ports for a second brake pressure supply line. First and second coaxial, hydraulic chambers in the body are interposed between the inlet and outlet ports of the first and second hydraulic pressure supply lines, respectively. First and second proportioning valve assemblies are located within the first and second hydraulic chambers respectively. The proportioning valve assemblies comprise first and second pistons slidably located in and coaxial with the first and second chambers respectively, each piston having an annular step in its surface. First and second annular valve seats are mounted on the inside surface of the first and second chambers respectively between the inlet and outlet ports, each valve seat having a central opening coaxial with a respective piston. First and second valve members are secured to the first and second pistons, respectively, and aligned with the opening in the respective valve seats such that seating the valve members on the valve seat prevents fluid flow through the respective outlet ports, hydraulic pressure acting on the annular step in the surface of each piston tending to seat the respective valve member. A single spring means is provided for biasing both pistons of the proportioning valve assemblies in one direction and tending to unseat the valve members from their respective valve seats in the proportioning valve assemblies.

Preferably, the first and second pistons are coaxially and serially arranged with one end of the first piston abutting one end of the second piston. In this configuration, spring means would preferably act on the other end of the first piston for biasing both pistons in one direction.

It may be preferred that the first and second pistons be coaxially and serially arranged with the first piston having a centrally located longitudinal cylindrical bore and the second piston including an elongated stem extending from one end thereof and coaxial with the first piston, the stem being slidably located in the bore of the first piston and its end remote from the second piston being coterminous with the end of the first piston remote from the second piston. In this configuration, a single spring means acts on the coterminous ends of the first piston and the stem biasing both pistons in one direction.

Preferably the spring means is a spring contained in an atmospheric pressure chamber coaxial with the first and second hydraulic chambers. However, it may be preferred for the spring means to be a load sensing spring the bias of which varies in response to the load conditions acting on the vehicle body.

BRIEF DESCRIPTION OF THE DRAWINGS

Various other objects, features and attendant advantages of the present invention will be more fully appreciated as the same become better understood by reference to the following detailed description, when considered in connection with the accompanying drawings, wherein.

DETAILED DESCRIPTION OF PREFERRED EMBODIMENTS

Figure 1:
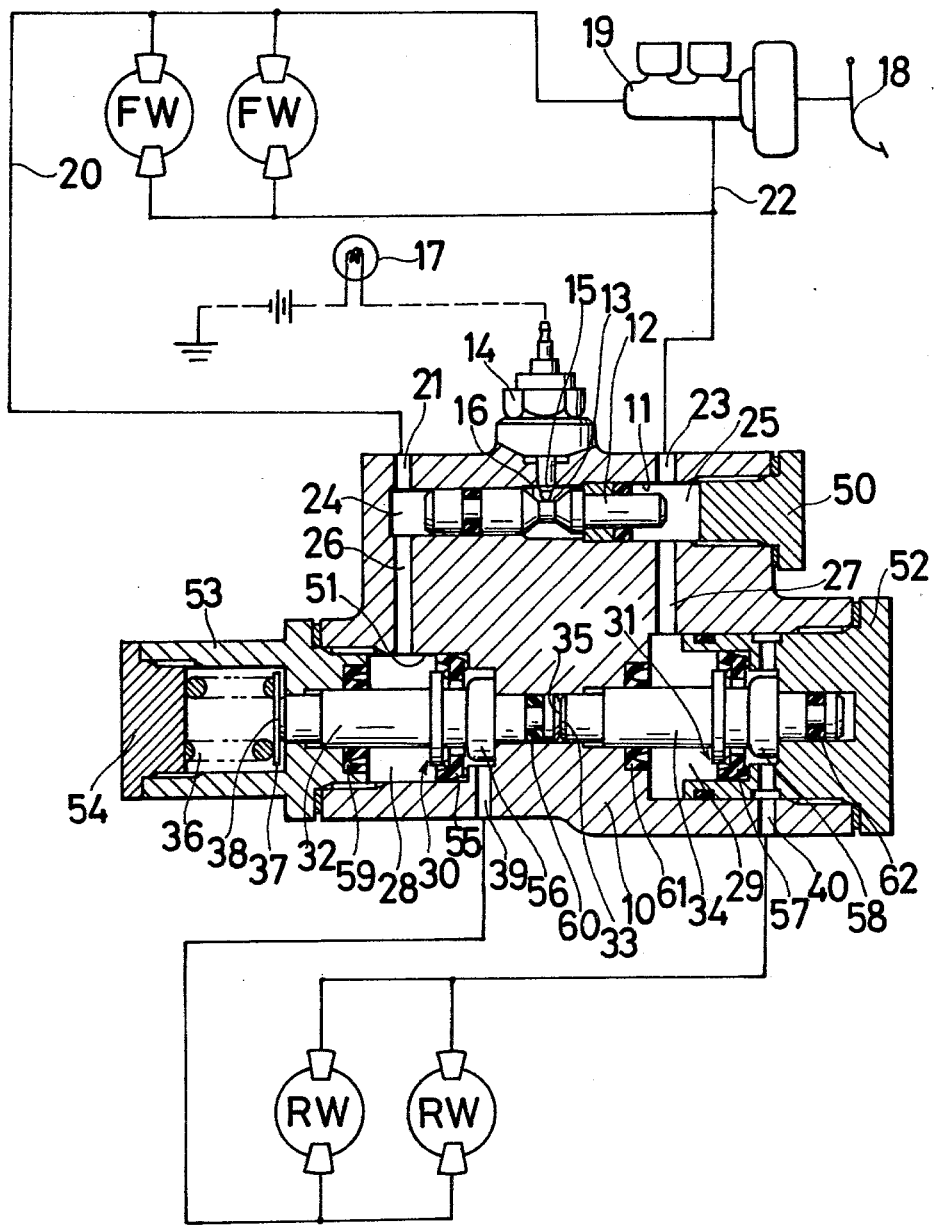
FIG. 1 is a sectional view illustrating a first embodiment of a control valve assembly, with a schematic hydraulic pressure control system, according to the present invention.

Referring now to FIG. 1 wherein a first embodiment is illustrated, a control valve assembly includes a body 10 having a cylindrical bore 11 one open end of which is closed by a plug 50, and a further stepped bore 51 both open ends of which are closed by plugs 52 and 54, respectively. The cylindrical bore 11 slidably receives a balance piston 12 having a central small land portion 13 with which a sensing rod 15 of a conventional microswitch assembly 14 is brought in contact, to thereby constitute a conventional fluid failure warning device. Thus, a warning light 17 is turned on to warn the fluid failure by means of an upward movement of the rod 15 through means of a tapered portion 16 of the balance piston 12 when the piston 12 is moved.

In accordance with the invention, the valve assembly body has first inlet and outlet ports in communication with a first chamber in a first brake pressure supply line and second inlet and outlet ports in communication with a second chamber in a second brake pressure supply line.

As here embodied, the body 10 has first and second inlet ports 21 and 23 for receiving braking fluid pressures from a tandem master cylinder 19 which associates with a brake pedal 18 through means of conduits 20 and 22, respectively. The first inlet port 21 leads to a first hydraulic chamber 28 through means of a chamber 24 and a passage 26 to thereby define a first brake pressure supply line while the second inlet port 23 leads to a second hydraulic chamber 29 through means of a chamber 25 and a passage 27 to thereby define a second brake pressure supply line.

In accordance with the invention, first and second proportioning valve assemblies are located in the first and second chambers, respectively. Each valve assembly comprises a slidably received piston coaxial with the other piston, movement of each of which opens and closes a valve in its chamber located between the inlet and outlet ports.

As here embodied, slidably received within the chamber 28 defined by the bore 51 is a first proportioning valve assembly 30 which includes a valve seat 55 and a piston 32 on which a valve member 56 is formed. Similarly, a second proportioning valve assembly 31 is slidably arranged within the chamber 29 and has a valve seat 57 and a piston 34 on which a valve member 58 is formed. Both proportioning valve assemblies 30 and 31 are arranged in series to each other so that both assemblies are synchronously movable in the same direction. Preferably, a rightward end 33 of the piston 32 is brought in sealing and co-axial contact with a leftward end 35 of the piston 34. The standard or size of each assembly 30 and 31 may preferably be the same.

In accordance with the invention, a single spring means biases both pistons in one direction tending to open the valves in each assembly. In one embodiment, FIG. 1, a spring means comprising a coil spring 36 is inserted between the plug 54 and a retainer 37, the retainer 37 being in contact with the leftward end 38 of the piston 32. Thus, both pistons 32 and 34 are biased by means of the single spring means 36 towards the right to thereby disengage the valve members 56 and 58 from the seats 55 and 57. The atmospheric chamber which accommodates the spring 36 therein is sealingly separated from the braking fluid lines.

The hydraulic chamber 28 is in communication with a first outlet port 39 when the valve assembly 30 occupies its open position and then to each rear wheel cylinder. Similarly, the hydraulic chamber 29 is adapted to be in communication with a second outlet port 40 through means of the valve assembly 31 and then to each rear wheel cylinder.

Preferably, seal means are provided for preventing fluid flow from the chambers other than through the ports. As embodied herein, seal 59 prevents fluid flow between first chamber 28 and the atmospheric chamber containing spring 36. Seals 60 and 61 prevent fluid flow between first chamber 28 and second chamber 29. Additionally, seal 62 prevents fluid flow from second chamber 29 around piston 34 into the cavity in plug 52.

In operation, the master cylinder 19 generates braking fluid pressures within the conduits 20 and 22, respectively, in proportion to a depression force on the brake pedal 18. The braking fluid pressures within the conduits 20 and 22 are directly transmitted to front wheel cylinders, respectively, on the one hand, and are transmitted to inlet ports 21 and 23 of the control valve assembly on the other hand. The braking fluid within the inlet port 21 is transmitted to each rear wheel cylinder through means of chamber 24, passage 26, chamber 28 and outlet port 39, while the braking fluid within the inlet port 23 is transmitted to each rear wheel cylinder through means of chamber 25, passage 27, chamber 29 and outlet port 40.

Since the pistons 32 and 34 each of which may be the same standard or size are biased by means of the single spring 36, both pistons 32 and 34 are urged to be simultaneously moved towards the left against the biasing force of the spring 36 when the braking fluid pressures exceed a predetermined value. Namely, the piston 32 is moved by means of the braking fluid pressure acting on the effective difference in area between the areas defined by seal members 59 and 60, and the piston 34 is moved by means of the braking fluid pressure acting on the effective difference in area between areas defined by seal members 61 and 62. Thus, valve seats 55 and 57 are brought in contact with valve members 56 and 58, respectively, thereby to interrupt the fluid communication between the inlet port 21 and the outlet port 30 and between the inlet port 23 and the outlet port 40.

Figure 2:
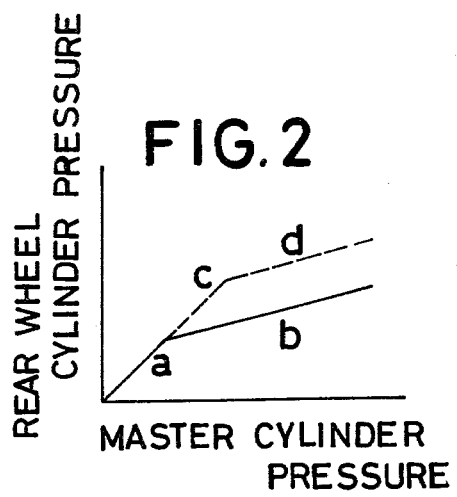
FIG. 2 is a graphic representation illustrating the characteristics of the fluid pressure controlled by means of the system of FIG. 1.

When the braking fluid pressures further increase, both pistons 32 and 34 are moved towards the right by means of the braking fluid pressures acting on the annular effective areas defined by the left end diameter of piston 32 and valving portions between valve members 56 and 58 and valve seats 55 and 57, respectively. Thus, each seat 55, 57 is re-disengaged from each valve member 56, 58 to thereby re-establish the fluid communications between inlet ports 21, 23 and the outlet ports 39, 40, respectively. Thereafter, the above valve function may be cyclically completed so that each rear wheel cylinder braking pressure is increased along the line a-b, as shown in FIG. 2.

Assuming that one of the braking fluid pressure line, for example, relating to the conduit 20 fails to operate, the balance piston 12 is moved towards the left by means of the fluid pressure within another pressure line so that the fluid failure warning device is actuated in the above mentioned manner. Under these conditions where there is no substantial hydraulic pressure within the chamber 28, both pistons 32 and 34 are urged against the biasing force of the spring 36 by means of the braking fluid pressure within only the chamber 29. Therefore, in comparison to the normal condition wherein both pistons 32 and 34 are urged by means of sum of braking fluid pressure within both chambers 28 and 29, double fluid pressure is required to cause the piston 34 to move against the biasing force of the spring 36. Thus, in the event of failure of the fluid pressure relating to conduit 20, each rear wheel cylinder brake pressure transmitted through means of the second proportioning valve assembly 31 is increased along the lines a-c-d, as shown in FIG. 2.

If the braking fluid pressure line relating to the conduit 22, it is obvious that each rear wheel cylinder brake pressure transmitted through means of the first proportioning valve assembly 30 is increased along the similar line a-c-d, and the fluid failure warning device is actuated.

Figure 3:
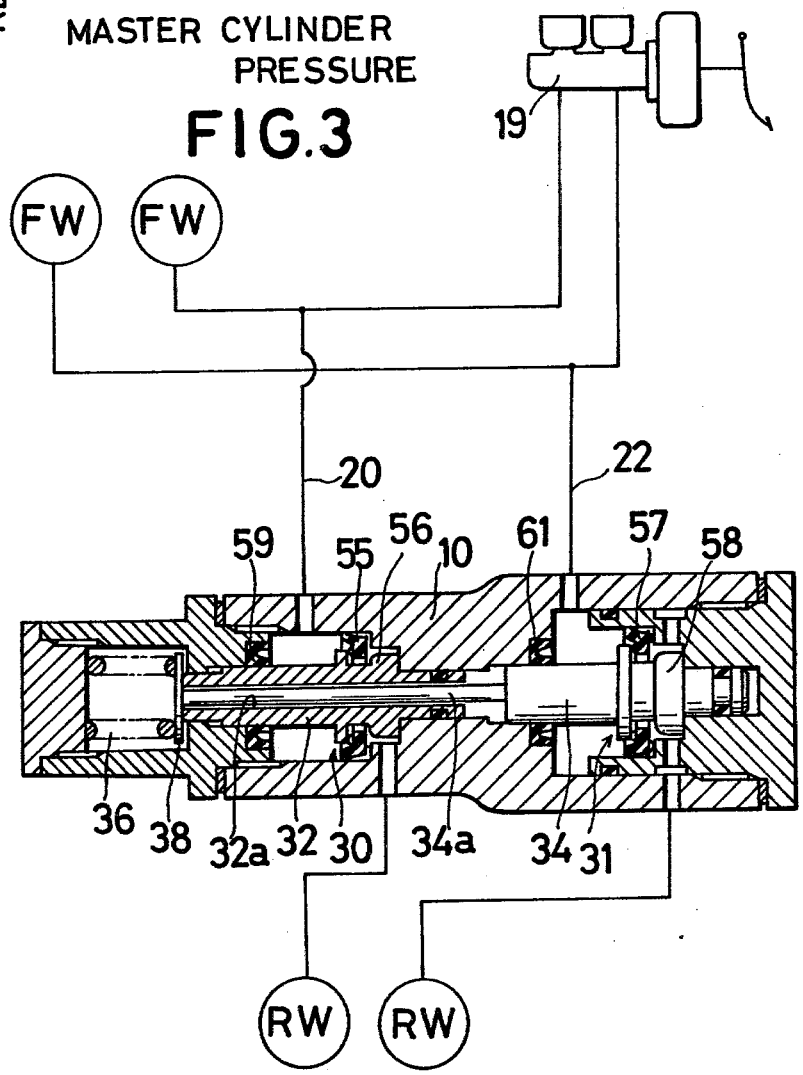
FIG. 3 is a sectional view similar to FIG. 1 but showing a second embodiment of the present invention.

In another embodiment of FIG. 3, the present invention is illustrated. The same parts as those of the previous embodiment will be represented by the same numerals and thus only the different parts will be explained hereinafter.

Piston 32 of the first proportioning valve assembly 30 has an axial cylindrical bore 32a within which an extending stem portion 34a of piston 34 of the second proportioning valve assembly 31 extends. Piston 32 does not abut piston 34. Both of the annular left end of the piston 32 and the left end of the stem 34a are coterminous and brought in contact with the retainer 38 so that both pistons 32 and 34 are biased towards the right by the biasing force of the single spring means 36.

The operation of this embodiment will be the same so that the detailed description thereof will be omitted.

Figure 4:
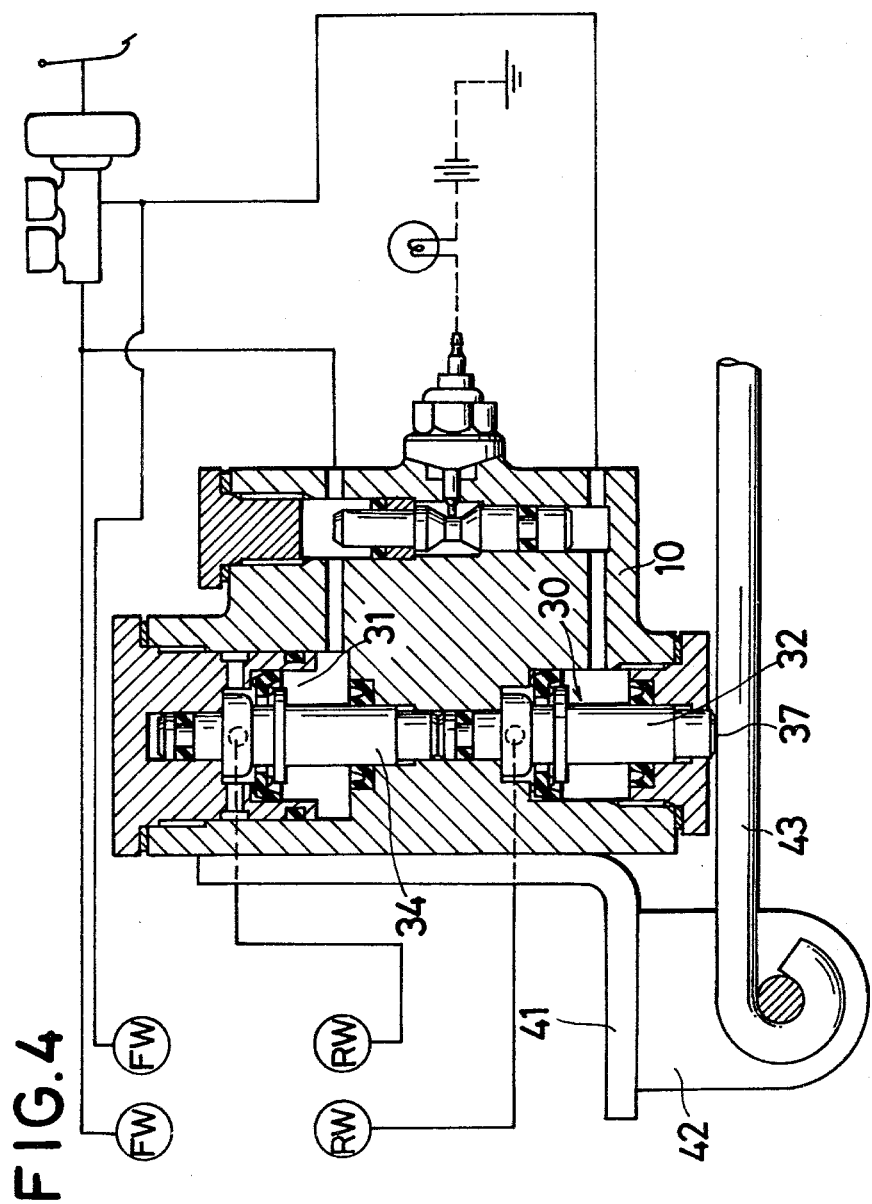
FIG. 4 is a sectional view similar to FIG. 1, but showing a third embodiment of the present invention.

In FIG. 4 a third embodiment of the present invention is illustrated, only the different parts from the previous embodiments will be explained.

This embodiment has a bracket 41 which is secured to the body 10 and a supporting portion 42 integrally with the bracket 41. A load-sensing spring means 43 is pivoted on the supporting portion 42 to thereby bias the end portion 37 of the piston 32 of the first proportioning valve assembly 30. Thus, the load-sensing spring means 43 biases both pistons 32 and 34 in proportion to the load acting on the vehicle body. Therefore, according to this embodiment, the predetermined value, such as shown at a in FIG. 2, in excess of which increases in the magnitudes of the input fluid pressures will result in proportionally reduced increases in the output fluid pressures, will be shifted in proportion to increases in load condition. Other operation of this embodiment will be the same as that of the previous embodiment so that the detailed explanation will be omitted.

Various other modifications and variations of the present invention are obviously possible in light of the above teachings. It is to be understood, therefore, that within the scope of the appended claims, the present invention may be practiced other than as specifically described herein.

What is claimed is:

1. A hydraulic pressure control valve assembly for vehicles having dual hydraulic brake systems, comprising:
   (a) a valve assembly body having first inlet and outlet ports for a first hydraulic brake pressure supply line and second inlet and outlet ports for a second hydraulic brake pressure supply line;
   (b) a first hydraulic chamber within said body in fluid-flow communication with said first inlet and outlet ports;
   (c) a second hydraulic chamber within said body in fluid-flow communication with said second inlet and outlet ports, said first and second chambers being coaxial;
   (d) first and second proportioning valve assemblies within said first and second hydraulic chambers, respectively, said proportioning valve assemblies comprising:
   (1) first and second pistons slidably located in and coaxial with said first and second chambers, respectively, each said piston having an annular step in its surface, said first piston having a centrally-located, longitudinal, cylindrical bore and said second piston including an elongated stem extending from one end thereof coaxial with the first piston, said stem being slidably located in the bore of said first piston, the end of said stem remote from said second piston and the end of the first piston remote from said second piston being coterminus;
   (2) first and second annular valve seats mounted on the inside surface of said first and second chambers, respectively, between said inlet and outlet ports, each valve seat having a central opening coaxial with a respective piston; and
   (3) first and second valve members secured to said first and second pistons, respectively, and aligned with the opening of said respective valve seats such that seating said valve members on said valve seats prevents fluid flow through said respective outlet ports, hydraulic pressure acting on said annular steps tending to seat said valve members; and
   (e) a single spring means for biasing both said pistons of said proportioning valve assemblies in one direction and tending to unseat said valve members from said valve seats in said proportioning valve assemblies.

2. The control valve assembly of claim 1 wherein said spring means acts on the coterminous ends of said first piston and said stem for biasing both pistons in one direction.

3. The control valve assembly of claim 2 also including an atmospheric pressure chamber coaxial with said first and second hydraulic chambers and wherein said spring means is a spring contained in said atmospheric pressure chamber.

4. The control valve assembly of claim 3 also including seal means for preventing fluid flow between said first and second hydraulic chambers, seal means for preventing fluid flow between said first hydraulic chamber and said atmospheric pressure chamber, and seal means for preventing fluid flow from said chambers other than through said ports.

5. The control valve assembly of claim 2 wherein said spring means is a load-sensing spring the bias of which varies in response to the load conditions acting on the vehicle body.

6. The control valve assembly of claim 5 also including seal means for preventing fluid flow from said first and second hydraulic chambers other than through said ports.

* * * * *